United States Patent Office 3,649,584
Patented Mar. 14, 1972

3,649,584
COMPOSITION FOR CHEMICAL MILLING MASKANT
Wesley T. Bailey, Palos Verdes Estates, and Robert Cummings, Anaheim, Calif., assignors to Purex Corporation, Ltd., Lakewood, Calif.
No Drawing. Filed Feb. 20, 1969, Ser. No. 801,207
Int. Cl. C08f 45/30; C23f 1/04
U.S. Cl. 260—31.2                                      7 Claims

ABSTRACT OF THE DISCLOSURE

The incorporation of a normally liquid synthetic organis polymer into a composition comprising elastomer reinforcing agents and a solution in a prechloroethylene-containing solvent of an elastomer reduces incidence of voids and pinholes in maskant coatings formed from the composition including at low percentage volumes of perchloroethylene in the elastomer solvent.

BACKGROUND OF THE INVENTION

(1) Field of the invention

The present invention is directed to improvements in maskant compositions intended for application to metallic workpieces to facilitate subsequent selective etching of the workpiece by a technique commonly termed "chemical milling" and to the preparation of such compositions.

Various chemically resistant and metal adherent materials have been recommended for use as maskant coatings. These materials are generally of an elastomeric type and may contain a reactive phenolic resin and a polyvalent metal oxide. Application of such compositions to the workpiece may be accomplished by dip coating, flow coating, spraying or brush or roller coating. In each instance, a solution of the normally solid elastomer is employed.

(2) Prior art

The use of perchloroethylene as a solvent in such solutions provides dramatic improvements in the incidence of voids and pinholes. This solvent is however costly. This invention is primarily concerned with achieving the low void incidence associated with the use of perchloroethylene as the solvent even with relatively low, including minor amounts of perchloroethylene in the solvent.

Aromatic hydrocarbons have been employed as solvents in elastomer-based maskant compositions in the past. See U.S. Pat. 3,227,589 to Deutsch as typical of current practice with respect to solvents. Criteria in solvent selection have included cost and solvating power and in these respects toluene has been outstanding. Toluene is not without disadvantages however, primary among which is flammability. Replacements for toluene have been slow to acceptance because of cost considerations. Particularly not regarded with favor have been solvents having lower solvating ability than toluene, and higher price as well.

It has recently been discovered than one solvent which has lower solvating ability and is more costly than toluene is nonetheless surprisingly desirable as a maskant solvent, namely perchloroethylene solvent, a liquid organic solvent comprising at least about 60% and preferably 80% or more by volume of perchloroethylene, i.e. tetrachloroethylene, and up to 40% of other elastomer solvents.

Surprisingly, the perchloroethylene was found to be less costly in use as a system because of reduced incidence of voids or uncoated areas in coating with perchloroethylene dissolved elastomer maskant composition. Improved leveling and flow characteristics were also achieved, meaning fewer holidays and less sloughing of maskant from workpiece area. Even more surprisingly, the perchloroethylene was less prone to void formation on evaporation from the coated maskant, which reduced coating failure, and withal a relatively thickness coating was achieved with such solutions enabling use of fewer overcoats.

The use of lower volume concentrations of perchloroethylene in the elastomer solvent than about 60% however, which is desirable from a cost standpoint was found to adversely affect void and pinholing characteristics.

SUMMARY OF THE INVENTION

It has now been discovered that incorporation of a normally liquid synthetic organic polymer, e.g. isobutylene polymer in a maskant composition employing perchloroethylene as a solvent enables use of much lower solvent concentrations of the perchloroethylene while maintaining the desirable void and pinholing characteristics high levels of perchloroethylene provide.

Typical of solvent based coating materials chemical milling maskant compositions contain a multitude of small entrapped air bubbles when the coating is applied. Some large bubbles near the surface of the coatings will break if the coating is sufficiently fluid. Most, however, are retained under the film formed by solvent evaporation and destroy or substantially reduce the protective properties of the coating.

Expendients presently used for overcoming this problem include use of slow evaporating slovent systems and/or applying the coating at low solution viscosities in several applications to get the requisite coating thickness. These expedients increase operating costs considerably. Additives which promote bubble breaking or release while the solvent is evaporating from the applied coating such as silicone oils are effective, but use of such oils is limited to those uses where contamination by the oil will not interfere with subsequent operations such as adhesive bonding and recoating.

The present invention is premised on the combination of a particular solvent i.e. a perchloroethylene containing solvent and a normally liquid synthetic organic polymer to achieve bubble breaking and release from an elastomeric maskant composition while the solvent is evaporating from the applied coating without requiring extended drying times, successive application or possibly of improving the incidence of voids and pinholes, particmigratory and contaminating additives.

Thus in the preparation of coating compositions useful as chemical milling maskants by mixing together a solution of a normally solid elastomer in a liquid organic solvent comprising perchloroethylene and reinforcing agents for the elastomer, the invention provides a method of improving the incidence of voids and pinholes, particularly at relatively low concentrations of perchloroethylene e.g. 5 or 10% to 60% by volume of the total solvent, which includes incorporating in the elastomer solution-reinforcing agent mixture a soluble amount, between 2 and 25 parts by weight of a normally liquid synthetic organic polymer, per 100 parts of the normally solid elastomer. The terms "normally solid" or "normally liquid" herein have reference to physical states at 25° C.

The cosolvent or diluent employed with the perchloroethylene e.g. in amounts of at least 40% by volume may be selected from aromatic solvents containing up to 10 carbon atoms inclusive and saturated aliphatic solvents containing up to 8 carbon atoms inclusive.

The amount of normally liquid polymer incorporated will typically be varied inversely with the proportion of perchloroethylene in the solvent, to maintain approximately equivalent pinholing and void characteristics in the maskant composition.

The maskant composition according to the invention for forming coatings on metallic surfaces adherent to such surfaces and resistant to chemical milling solutions accordingly comprises elastomer reinforcing agents and a solution in a solvent comprising perchloroethylene of a normally solid elastomer and from 2 to 25 parts by weight of a normally liquid synthetic organic polymer such as polyisobutylene, per 100 parts of the elastomer. The elastomer is preferably a block copolymer of styrene and a conjugated diene such as isoprene and particularly butadiene. Highly advantageous maskants are prepared according to the invention using styrene-butadiene block copolymers having a resilience in the uncured state of at least 40% and at least one polystyrene block of a length sufficient for the copolymer to exhibit a glass transition temperature above about 50° C. and at least one polybutadiene block of a length sufficient for the copolymer to exhibit a glass transition temperature below about −50° C.

The elastomer reinforcing agents may comprise about 2 to 20 parts of heat reactive phenolic resin and 1.5 to 10 parts of reactive polyvalent metal oxide per 100 parts of the elastomer and liquid polymer taken together.

The solvent typically contains 10 to 60% by volume of perchloroethylene and is present in an amount providing between 5 and 50% solids by weight in the composition.

The present method and composition in facilitating bubble release provide significant advantages in film integrity against leakage of etchants, permitting use of lesser thicknesses of the coating, fewer coating applications and obviating need of repair efforts on applied coatings, as well as minimizing parts rejection stemming from etchant leakage through undetected or inadequately repaired bubbles.

DESCRIPTION OF THE PREFERRED EMBODIMENTS

The solvent used in preparing the coating composition to be applied by the method of the present invention is perchloroethylene solvent. As stated above from 0 to up to 95% by volume of the perchloroethylene solvent may be comprised of other liquid organic elastomer solvents. Among such solvents are aromatic hydrocarbons, in general such as those having up to 10 carbon atoms such as toluene, xylene and benzene and ethylbenzene and chlorinated versions of these solvents such as chlorobenzene, dichlorobenzene and trichlorobenzene; and saturated aliphatic hydrocarbons having up to 8 carbon atoms such as hexane, heptane and octane and such hydrocarbons which are chlorinated and contain up to 3 carbon atoms such as methylchloroform and trichloroethylene as well as ester derivatives of such hydrocarbons such as the lower alkyl ester of lower mono-carboxylic acids e.g. butyl and amyl acetate.

The solution applied to the workpiece surface will generally contain from 5 to 50% by weight solids depending on surface orientation, contour, ambient temperature, thickness of coating desired and other factors which vary from job to job.

The solids content of the composition is comprised of the elastomer component and usually the reactive phenolic resin and reactive polyvalent metal oxide along with, optionally, fillers, extenders, and special additives e.g. antiozonants, for specific purposes.

The elastomer component may be any of the elastomer compositions heretofore known for use in maskants e.g. butyl rubber, chloroprene, nitrile rubber, natural rubber, and mixtures thereof. Preferred as the rubber component are styrene-butadiene copolymer and styrene-isoprene copolymer, elastomers particularly block copolymers of styrene and butadiene. These last copolymers, particularly having styrene-butadiene ratios from 60:40 to 20:80 and preferably from about 55:45 to 28:72 and a resilience of at least 40% in the uncured state confer exceptional benefits in chemical resistance, mechanical strength, adhesion and flexibility. These copolymers are characterized by having at least one polystyrene block of a length sufficient for the block copolymer to exhibit a glass transition temperature above about 50° C. and a polybutadiene block of a length sufficient for the block copolymer to exhibit a glass transition temperature below about −50° C.

These block copolymers have the chemical resistance and strength typical of the polystyrene block and the flexibility and adhesion of the elastomer portion, i.e. the polybutadiene block. In one material there thus is provided all the critical properties needed in a maskant rubber. Secondly, because these strength properties may be achieved without the use of cure agents or accelerators, use of these copolymers results in savings in raw material costs, in material waste due to premature cure, in blending costs, in cure equipment costs and in time and provide overall greater uniformity and predictability of results. Therefore, although a cure agent may be present, adequate levels of tensile strength are present for presently known uses of maskants in the "uncured," raw or gum stock block copolymer taught herein.

Block copolymers are distinguished in molecular structure from random copolymers. In the latter, the two monomer species are in alternating relationship roughly proportional to their ratio in the polymerization system and their reaction rate. In block copolymers on the other hand, one monomer species then the other is polymerized so that long homogeneous chains of one monomer species are formed joined to homogeneous chains of the other monomer species. This type of copolymer structure in general is detectable by the presence of two distinct glass transition temperatures for the copolymer, one for each species which approximates the glass transition temperature for the polymer of that monomer alone, whereas an alternating or random copolymer shows but one "compromise" glass transition temperature. For example the block copolymer employed in the examples herein is composed of blocks of polystyrene and polybutadiene and exhibits a glass transition temperature of −84° C. which is closely approximate the published glass transition temperature of polybutadiene homopolymer and a second glass transition temperature at +98° C. which is closely approximate the published glass transition temperature of polystyrene homopolymer.

As used herein the term "glass transition temperature" refers to that temperature at which molecular movement in a material is so slow that the material appears hard or glass-like, or changes from a soft to a harder material. Any test measuring the temperature range at which a non-crystallizing liquid becomes brittle will give a good indication of glass transition temperature. The test described by L. N. Kattas in a paper, "An Evaluation of the Torsion Pendulum in the Accelerated Environmental Testing of Paint Films," presented at the ACS Division of Organic Coatings and Plastics Chemistry, March 1966, provides such a measure.

Another distinguishing characteristic of block copolymers is their resilience or "snap" in the uncured state. The block copolymers, without cure, exhibit a resilience, measured according to ASTM D–945, greater than 40% and often 50% and higher. Random copolymers, on the other hand, are lower in resilience when in the uncured or "gum stock" stage, being on the order of only 20% (e.g. SBR 1500 styrene-butadiene random copolymer).

The combination of resilience and chemical resistance afforded by the block copolymers makes them superior materials for use in maskants, a use in which cohesive strength, to enable peeling from the substrate, is as important as resistance to etchant chemicals in etching solution. The many benefits of block polymers can be approximately at lower cost by combining up to 10 parts by weight, per 100 of another lower cost elastomer in the composition, e.g. one or more of chlorosulfonated polyethylene, nitrile rubber, polyisoprene, chloroprene or butyl rubber.

While the preparation of the block copolymer does not form a part of the present invention, there are several routes to their preparation. For example these block copolymers can be prepared by the use of lithium based initiators either in polar or nonpolar solvents dependent on the structure of the conjugated diene polymer blocks desired. The lithium based catalysts include lithium metal, alkyl lithiums and dilithiums with alkyl lithiums such as butyl lithium up to octyl and like alkyl lithiums being preferred. Polymerization is carried out by alternate feeding of styrene and butadiene monomer into the reaction system for a time and at a rate predetermined to provide the desired chain lengths of the two monomer species. Alternatively, preformed chains may be connected through a coupling reaction using a poly-functional reagent such as divinylstyrene.

Other, copolymerizable monomers can be incorporated in the styrene-butadiene block copolymers. In general, any vinyl unsaturated compound and conjugated diene can be incorporated in the block copolymer. For example in addition to polystyrene poly (vinyl) blocks can include polymers and copolymers of vinyl monomers such as vinyl arenes, e.g. vinyl toluene, vinyl xylene, ethyl vinyl benzene and vinyl naphthalene, vinyl pyridine, vinyl halides and vinyl carboxylates, as well as acrylic monomers such as acrylonitrile, methacyonitrile, esters of acrylic acids and the like. Poly (diene) blocks can be prepared from such conjugated dienes as isoprene, copolymers of styrene and butadiene and homologues thereof in addition to butadiene.

As stated above the block copolymers useful herein exhibit two distinct glass transition temperatures one above 50° C. and one below −50° C. Molecular weight of copolymer constituents sufficient to provide these glass transition values are in general a polystyrene block of at least 5,000 and preferably 15,000 to 100,000 and more and a polybutadiene block of at least 14,000 and preferably 25,000 to 150,000 and more.

As with maskant compositions heretofore known it is desirable to employ elastomer reinforcing agents including small amounts of phenolic resin, generally 2 to 20 parts by weight per 100 of the elastomer component to control the specific degree of adhesion and peelability. Among phenolic resins, phenol-aldehyde resins and particularly alkylphenol-, such as nonylphenol-formaldehyde resins are preferred. Used in conjunction with the phenolic resin also as a reinforcing agent is a small amount of polyvalent metal oxide, preferably an alkaline earth metal oxide such as magnesium, red lead or zinc oxide in amounts of 0.1 to 10 parts by weight per 100 of the elastomer and proportioned to the amount of phenolic resin employed.

A variety of fillers and extenders can also be employed to reduce cost and modify certain properties. For example, clays including organic, e.g. amine coated clays, carbon black, silicas and talc and petroleum oils can be incorporated in the maskant composition, e.g. in amounts between 0 and 300 parts per 100 parts of rubber.

Accelerators and cure agents are not required but can be used, as explaned above. Typical useful accelerators and cure agents are described in U.S. Pat. 3,079,352 to Atkins et al. Dibutyl or diethyl thioureas may be incorporated against ozone attack of the rubber.

The components of the maskant composition may be mixed or blended in any desired manner. The composition can be made in varying viscosity ranges depending particularly on the amount of solvent incorporated in the formulation and the relative proportions of elastomer present, and the formulation can be stored or applied immediately to the surface of the article to be coated.

The above maskant composition can be applied to the substrate or metal surface in any suitable manner such as by spraying, brushing, flow coating, dipping, silk screening or any other method for applying paints, lacquers or coatings. Although the novel maskant solution is particularly suited for use on aluminum and its alloys as substrates, it is to be understood that such formulation can also be employed on other materials such as ferrous and other non-ferrous alloys to protect certain areas thereof from corrosion by etching solutions. Hence, the formulation is alkali resistant and is also resistant to non-oxidizing acids and to oxidizing acids when sufficiently dilute and at moderately elevated temperatures.

After application of the maskant composition to the substrate, the coating is dried to a continuous film. It has been found that the present composition solutions flow over workpiece surfaces in a highly advantageous manner. These coating solutions tend to level better than solutions based on other solvent systems, providing a more uniform and attractive coating. More importantly the release of solvent bubbles from the drying composition is less troublesome in the perchloroethylene system due either to absence of early skinning in the coating which further contributes to advantageous coating performance through the substantial elimination of voids produced by late leaving solvent bubbles breaking the coating surface integrity, or more rapid bubble release owing to greater disparity in density of air bubbles and coating.

The use of reduced amounts of perchloroethylene in the elastomer solvent, to as little as 5% by volume while achieving the benefits described is realized in the present compositions through use of the liquid synthetic organic polymer in amounts between 2 and 25 parts per 100 parts of the elastomer. In general the relative amount of such polymer is inversely proportional to the amount of perchloroethylene in the solvent. Low perchloroethylene concentration e.g. 5 to 10% by volume of the total solvent will typically require 20 to 25 parts of the liquid polymer to have good bubble breaking, while higher concentrations of perchloroethylene e.g. up to 60 to 80% and higher by volume will require much lower quantities of liquid polymer e.g. 2 to 4 parts per 100 of the elastomer.

The normally liquid polymer herein is preferably polyisobutylene but may be as well a suitable molecular weight polyisoprene, butyl rubber, ethylene-propylene polymer or the like. Ordinarily such liquid polymers will be polymers of hydrocarbon monomers having from 2 to 4 carbon atoms with the polymers having molecular weights between about 5,000 and 15,000.

The following examples are illustrative of practice of the invention.

Example 1.—All parts and percentages by weight herein, unless otherwise stated.

A block copolymer of styrene and butadiene in a ratio of 31:69 exhibiting glass transition temperatures of −84° and +98° C. and having a resilience according to ASTM D–945 of about 60% was prepared by first polymerizing butadiene in the presence of butyl lithium catalyst in hexane solvent and, following substantially completely polymerizing the butadiene, styrene is added and substantially completely polymerized, and alternating in this manner until sufficient molecular weight is achieved.

The maskant composition was prepared by dissolving 96 parts of the block copolymer and 4 parts of normally liquid polyisobutylene having a molecular weight of 9,000 in 200 parts of perchloroethylene. There was then added to the matrix about 14 parts of nonylphenolformaldehyde resin (Bakelite CKR 1634) and 1.4 parts of magnesium oxide per 100 parts of the block copolymer. Clay and talc were added in amounts of 75 and 40 parts, respectively per 100 parts of the block copolymer. The resulting mixture was used as a maskant composition.

A 2024 aluminum alloy part was treated in noncorrosive alkaline cleaner and the part rinsed in water. The maskant composition consisting of the above mixture was coated onto the surface of the aluminum alloy part to form a coating about 0.004 to 0.008 inch thick. The substantial absence of pinholes and other coating discontinuities was noted. The perchloroethylene appeared to volatilize slowly in the coating and leave readily without substantial formation of air bubbles.

The part was immersed, without mask cure, in an 11% caustic alkali solution at a temperature of 190° F. After etching of the part to the desired depth in the exposed areas, the part was removed from the solution. It was observed that the mask was still tightly bonded to the part surface and particularly that the edges of the mask were still clean and sharp with no noticeable etching deterioration thereof, and that such edges were tightly bonded to the substrate. The mask was then peeled from the substrate by first inserting a sharp edged instrument beneath an edge of the mask, the mask thereafter being readily peelable from the part surface.

Examples 2-4. — The same maskant composition is prepared as in Example 1, except the solvent was (1) an 80/20 percent volume mixture of perchloroethylene and trichloroethylene (Example 2), (2) a 60/40 percent mixture thereof (Example 3) and (3) a 10/90 percent mixture of perchloroethylene and toluene (Example 4). The application of these maskant compositions were found to be adequate in coating performance and to be somewhat more rapid drying than the previous formulation. Pinholing was minimal in each case.

Example 5.—Using the procedures of Example 1, a maskant composition is prepared by using 10 parts nitrile rubber in admixture with 90 parts of the styrene-butadiene elastomer. Results are satisfactory.

Example 6.—Each aluminum panel was cleaned of surface contamination by solvent cleaning with methyl ethyl ketone followed by toluene. The panel was then air dried prior to application of the maskant solution. Three coats of the particular maskant were applied to the panels. The drying time between each coat was ½ hour.

The composition of maskants was:

| Material | Parts by weight | |
|---|---|---|
| | Control I | Example 6 |
| Heat reactive phenolic resin | 8.50 | 8.50 |
| Magnesium oxide | 3.30 | 3.30 |
| Talc | 90.0 | 90.0 |
| Butadiene: styrene block polymer (Kraton 101) | 93.75 | 93.75 |
| Polyisobutylene (Vistanex) | 6.25 | 6.25 |
| Perchloroethylene | 0 | 165.96 |
| Toluene | 301.75 | 135.79 |
| Miscellaneous specific purpose additives | 3.5 | 3.5 |

The following sequence of conditioning events was followed prior to applying each of the three coats of maskant to the test panel—

Approximately ¾ gallon of the maskant solution was placed in a one gallon paint can and agitated on a vibrating type paint mixer for five minutes.

The maskant was then transferred to an open top container of sufficient dimension to accommodate the test panel and to permit it to be submerged in the test maskant.

Within 60±5 seconds of the completion of mixing on the paint mixer, the test panels were dipped in the conditioned maskant.

The dipped panels were then suspended such that all excess maskant solution was allowed to drain parallel to the long dimension of the panel.

The dipped panels were allowed to drain and air dry for 30±5 minutes prior to applying each coat.

Test panels were given three coats. Each coat as applied contained an amount of air bubbles equivalent to or in excess of any that might be encountered even on a temporary basis in production dipping operatinos. Accordingly, since all significant variable except solvent composition were eliminated, the test method and results obtained from it provide an accurate comparison of the effect of changes in composition of the maskant solvent on the retention of air bubbles in the dried maskant film.

The average number of defects per squire inch (pinholes, bubbles) was as follows: The 100% toluene panel (Control I) had an average of 139 defects; the panel coated with the herein disclosed composition (Example 6) had only 32 defects, with 60% of the toluene replaced.

Visual and tactile inspection of the panels revealed the dramatic differences in smoothness and coating uniformity.

Example 7.—Example 1 is duplicated employing a 50% solution of the composition. Adequate results are realized.

We claim:

1. Maskant composition for forming coatings on metallic surfaces adherent to such surfaces and resistant to chemical milling solutions which comprises a normally solid block copolymer of styrene and a conjugated diene selected from isoprene and butadiene said copolymer exhibiting glass transition temperatures below −50° C. and above +50° C., from 2–25 parts by weight per 100 parts of said block copolymer of a normally liquid polymer having a molecular weight below 15,000 and comprising polyisoprene or a polymer of a hydrocarbon monomer having 2 to 4 carbon atoms inclusive, rubber reinforcing agent comprising from 2 to 20 parts of heat reactive phenolic resin and from 0.1 to 10 parts of reactive polyvalent metal oxide per 100 parts by weight of said syrene copolymer and said liquid polymer taken together and a solvent therefor in an amount to give a solution having from 5 to 50% solids, said solvent containing at least 5% by volume perchloroethylene and the balance a solvent selected from (a) aromatic solvents having up to 10 carbon atoms;
(b) chlorinated aromatic solvents having up to 10 carbon atoms;
(c) caturated aliphatic hydrocarbons containing up to 8 carbon atoms;
(d) chlorinated saturated aliphatic hydrocarbons containing up to 3 carbon atoms; and
(e) alkyl esters of acetic acid in which the alkyl group contains 4 or 5 carbon atoms.

2. Maskant composition according to claim 1 in which said diene is butadiene and contains at least one polystyrene block of 5,000 molecular weight and at least one polybutadiene block of at least 14,000 molecular weight.

3. Maskant composition according to claim 2 in which said copolymer has a resilience in the uncured state of at least 40%.

4. Maskant composition according to claim 2 in which said liquid polymer is polyisobutylene.

5. In the method for the preparation of coating compositions useful as chemical milling maskants, by combining a normally solid styrene-butadiene block copolymer having a styrene:butadiene weight ratio between 60:40 and 20:80 and exhibiting glass transition temperatures below −50° C. and above +50° C., perchloroethylene solvent containing at least 5% by volume perchloroethylene and the balance a solvent selected from (a) aromatic solvents having up to 10 carbon atoms;
(b) chlorinated aromatic solvents having up to 10 carbon atoms;
(c) saturated aliphatic hydrocarbons containing up to 8 carbon atoms;
(d) chlorinated saturated aliphatic hydrocarbons containing up to 3 carbon atoms; and
(e) alkyl esters of acetic acid in which the alkyl group contains 4 or 5 carbon atoms, and rubber reinforcing agent comprising heat reactive phenolic resin and reactive polyvalent metal oxide, the step of incorporating in the mixture from 2 to 25 parts of a normally liquid polyisobutylene having a molecular weight between 5,000 and 15,000 per 100 parts by weight of block copolymer, the resulting mixture containing 5 to 50% by weight solids.

6. Maskant composition for forming coatings on metallic surfaces adherent to such surfaces and resistant to chemical milling solutions which comprises a normally solid styrene-butadiene block copolymer exhibiting glass transition temperatures below −50° C. and above +50° C., having a styrene:butadiene weight ratio between 60:40 and 20:80 and a molecular weight in excess of 40,000, from 2 to 25 parts by weight per 100 parts of said block copolymer of a normally liquid polyisobutylene having a molecular weight below 15,000, rubber reinforcing agent comprising from 2 to 20 parts of heat reactive phenolic resin and from 0.1 to 10 parts of reactive polyvalent metal oxide per 100 parts by weight of said styrene-butadiene copolymer and said polyisobutylene taken together and a solvent therefor in an amount to give a solution having from 5 to 50% solids, said solvent containing at least 5% by volume perchloroethylene and the balance a solvent selected from
  (a) aromatic solvents having up to 10 carbon atoms;
  (b) chlorinated aromatic solvents having up to 10 carbon atoms;
  (c) saturated aliphatic hydrocarbons containing up to 8 carbon atoms;
  (d) chlorinated saturated aliphatic hydrocarbons containing up to 3 carbon atoms; and
  (e) alkyl esters of acetic acid in which the alkyl group contains 4 or 5 carbon atoms.

7. Maskant composition according to claim 6 in which said solvent contains from 40 to 90% by volume perchloroethylene.

References Cited

UNITED STATES PATENTS

| | | | |
|---|---|---|---|
| 3,179,617 | 4/1965 | Moore | 260—33.8 U |
| 3,265,765 | 8/1966 | Holden | 260—28.5 B |
| 3,350,377 | 10/1967 | Norwood | 260—33.8 U |
| 3,361,693 | 1/1968 | Geschwind | 260—33.8 U |
| 3,378,512 | 4/1968 | Hamed | 260—33.8 U |
| 3,459,577 | 8/1969 | Weibel | 260—33.8 U |
| 3,227,589 | 1/1966 | Deutsch | 260—33.6 A |
| 3,325,320 | 6/1967 | Shepherd | 156—13 |
| 3,544,400 | 12/1970 | Deutsch | 156—13 |
| 3,475,362 | 10/1969 | Romanick | 260—33.8 U |
| 3,488,315 | 1/1970 | Stucker | 260—33.8 U |
| 3,519,585 | 7/1970 | Miller | 260—33.8 U |

OTHER REFERENCES

A. K. Doolittle: "The Technology of Solvents and Plasticizers," 1954, p. 720.

Rubber World, "Materials and Compounding Ingredients for Rubber," May 1968, pp. 274, 285, 291.

Rubber World: "Materials and Compounding Ingredients for Rubber," 1968 Edition, published Apr. 18, 1968, p. 230.

ALLAN LIEBERMAN, Primary Examiner

P. R. MICHL, Assistant Examiner

U.S. Cl. X.R.

156—13; 260—33.6 A, 33.8 UA

UNITED STATES PATENT OFFICE
CERTIFICATE OF CORRECTION

Patent No. 3,649,584    Dated March 14, 1972

Inventor(s) Wesley T. Bailey and Robert Cummings

It is certified that error appears in the above-identified patent and that said Letters Patent are hereby corrected as shown below:

Column 2, line 3; "thickness" should read --thick--

Column 2, line 27, "Expendients" should read --Expedients--

Column 2, line 28, "slovent" should read --solvent--

Column 2, line 45, the whole line should be deleted "of improving the incidence of voids and pinholes, partic-"

Column 7, line 65, "operatinos" should read --operations--

Column 8, line 29, "caturated" should read --saturated--

Signed and sealed this 25th day of July 1972.

(SEAL)
Attest:

EDWARD M. FLETCHER, JR.
Attesting Officer

ROBERT GOTTSCHALK
Commissioner of Patents